May 29, 1923.
E. BLAUHORN
1,457,140
INJECTOR
Filed Aug. 22, 1921
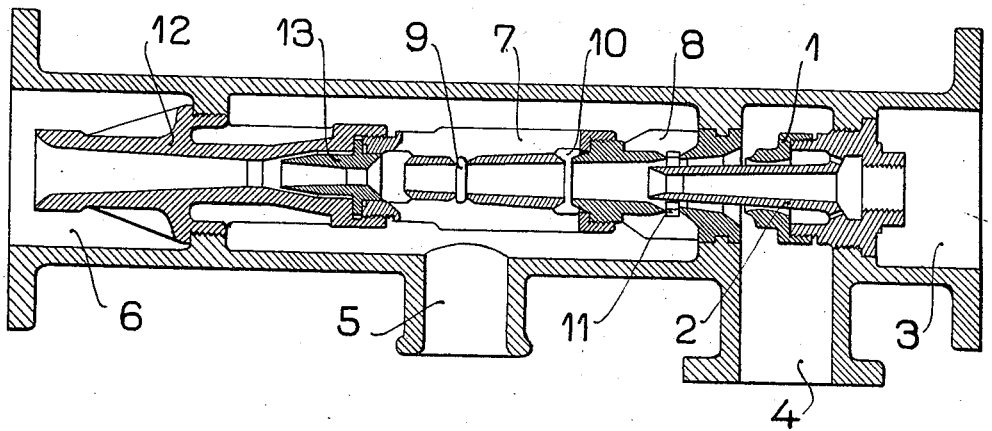
Inventor
Emanuel Blauhorn
By
Attorney Patented May 29, 1923.

1,457,140

UNITED STATES PATENT OFFICE.

EMANUEL BLAUHORN, OF VIENNA, AUSTRIA.

INJECTOR.

Application filed August 22, 1921. Serial No. 494,139.

*To all whom it may concern:*

Be it known that I, EMANUEL BLAUHORN, citizen of the Republic of Austria, residing at Vienna, Austria, have invented certain new and useful Improvements in and Relating to Injectors, of which the following is a specification.

In all injectors the combining cones converge to a point where the jet enters one cone at the narrowest cross section. From that point the cones diverge and the pressure is increased as the velocity diminishes. The wear of the cones takes place first at that part of the delivery cone which has the smallest internal cross section.

It is obvious to make the delivery cone in two parts in order that the part of the cone which has the least cross section should be easily replaced.

But since according to the views formerly held the cross section of the delivery cone must constantly increase and a new part of the cone cannot be made to fit into the cone without joints or steps, and because any unevenness injuriously affects the action of the injector, the division of the delivery cone into two parts has not been used to any practical extent. By more exact experiments it has been shown that the action of the injector is improved if the diverging end of the part of the cone which has the smallest cross section terminates in a part of the other cone which at first converges and then after a certain distance again diverges.

As regards the combining cone the wear of the part turned towards the delivery cone is essentially greater than that of the other and because the wear is proportional in inverse ratio to the cross section. In order to maintain economically the apparatus in efficient working condition it is advisable to divide the cone at this part, so as to permit the portion of the cone which has the smallest cross section to be replaced. More especially, in combining cones of self starting injectors which are known under the name of "re-starting injectors," and for this purpose are provided at several places with annular passages in order that the mixture of water and steam which escapes at starting may traverse larger cross sections, the division can be effected without prejudicial stepping, since the division may be made at the annular openings.

The accompanying drawing shows in longitudinal section an example of an injector according to the invention.

1 and 2 represent the steam nozzle comprising two concentric tubes, 3 is the steam inlet, 4 is the water inlet, 5 the escape outlet at starting, 6 the pressure space of the injector, 7 and 8 are two screw threaded portions which together form the combining cone, which is provided with the annular passages 9, 10 and 11.

The delivery cone consists, in contrast to known constructions, of two parts 12 and 13, of which the portion 13 has the smallest cross section and forms a member which is easily and cheaply manufactured. The portion 13 is removably connected with the part 12 of the delivery cone and the internal boring of the part 12 is such that the diverging cone of the part 13 conforms to the converging cone of the part 12. Consequently small inaccuracies in the length or the circumference of the part 13 do not injuriously affect the working of the injector and the member 13 need not fit exactly in the member 12.

What I claim is:

1. A delivery cone for injectors having a diverging bore, the cone comprising relatively separable constituent elements one of which forms the part of the bore which is of smallest cross section.

2. A delivery cone for injectors having a diverging bore and comprising constituent elements one of which forms the part of the bore which is of smallest cross section and is removably connected to the other element.

3. A delivery cone for injectors comprising a member having a bore a part of which converges and another part of which diverges, and a removable member fitted into that portion of the bore of the member first mentioned which converges and having a diverging bore which is directed toward the pressure space of the member first mentioned, the removable member forming that part of the bore of the cone which is of smallest cross section.

4. In an injector according to claim 1, a combining cone having an annular passage in its wall at a point intermediately of its length, said cone comprising constituent members which are removably joined at said passage.

5. In an injector according to claim 1, a combining cone having an outlet passage in its side wall intermediately of its ends, said cone comprising constituent elements which are detachably joined at said passage.

6. In an injector according to claim 1, a combining cone having annular outlet passages intermediately of its ends, said cone embodying a plurality of constituent lengths, the ends of which are joined at said passages.

In testimony whereof I have hereunto set my hand in presence of two subscribing witnesses.

ING. EMANUEL BLAUHORN.

Witnesses:
LEOPOLD FREYBERG,
RUDOLF SCHMIDT.